United States Patent [19]
Vrijma

[11] 3,805,655
[45] Apr. 23, 1974

[54] METHOD AND APPARATUS FOR CUTTING PLASTIC MATERIAL

[75] Inventor: Berend Vrijma, Mildijk, Netherlands

[73] Assignee: Calsilox S.A.

[22] Filed: Mar. 8, 1973

[21] Appl. No.: 339,093

Related U.S. Application Data

[62] Division of Ser. No. 48,267, June 22, 1970, Pat. No. 3,734,991.

[52] U.S. Cl............ 83/425.3, 83/435.1, 83/455, 83/651.1, 425/123, 425/182, 425/316
[51] Int. Cl............ B26d 4/02, B26d 1/02
[58] Field of Search....... 83/455, 425.3, 425.2, 425, 83/651.1, 431; 425/123, 182, 316

[56] References Cited
UNITED STATES PATENTS

| | | | |
|---|---|---|---|
| 2,694,846 | 11/1954 | Olsson et al. | 425/123 |
| 3,059,306 | 10/1962 | Hamilton | 83/425.3 X |
| 3,204,315 | 9/1965 | Akerfors | 425/316 |
| 3,225,412 | 12/1965 | Widell et al. | 83/425.3 |
| 3,344,492 | 10/1967 | Eggeling et al. | 425/182 X |

Primary Examiner—Donald R. Schran
Attorney, Agent, or Firm—Sandoe, Hopgood and Calimafde

[57] ABSTRACT

The invention relates to an apparatus for cutting a block of material in a plastic state, more particularly lightweight concrete, the block being cut by a number of cutting wires, each tensioned between a clamping member retained above the block and a clamping member retained therebelow. The block is cut while being carried by carrying means engaging opposite sides of the block.

6 Claims, 6 Drawing Figures

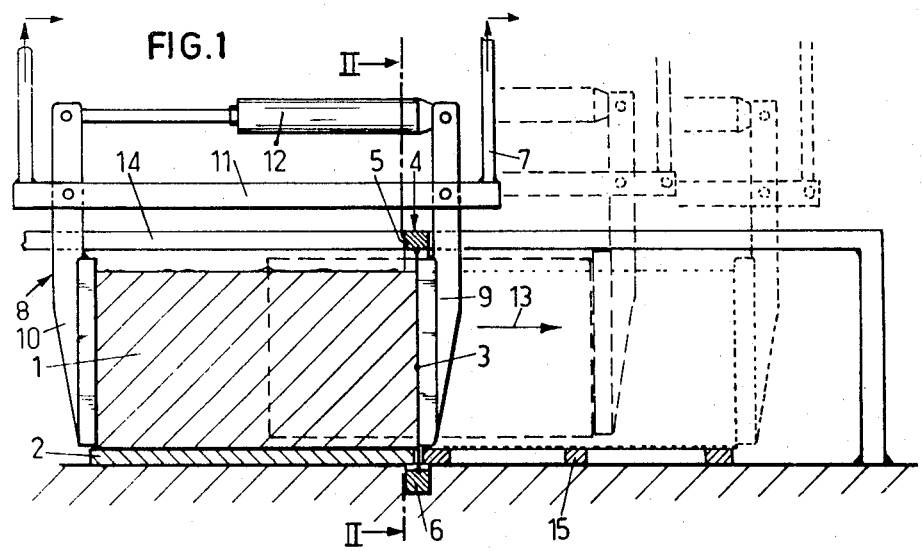
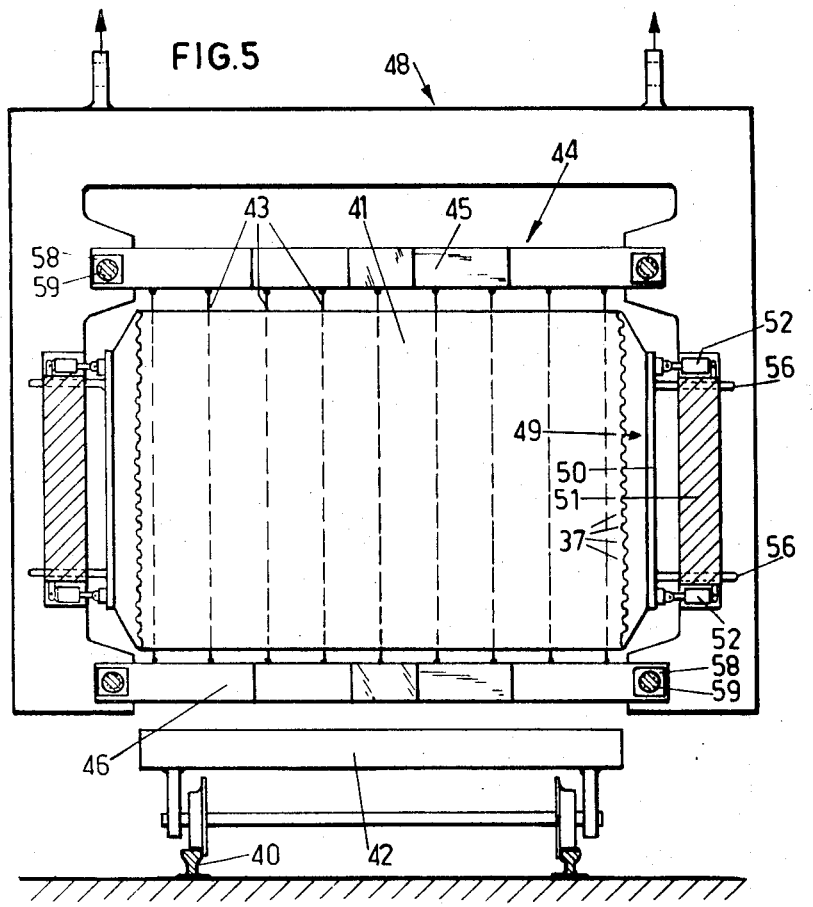

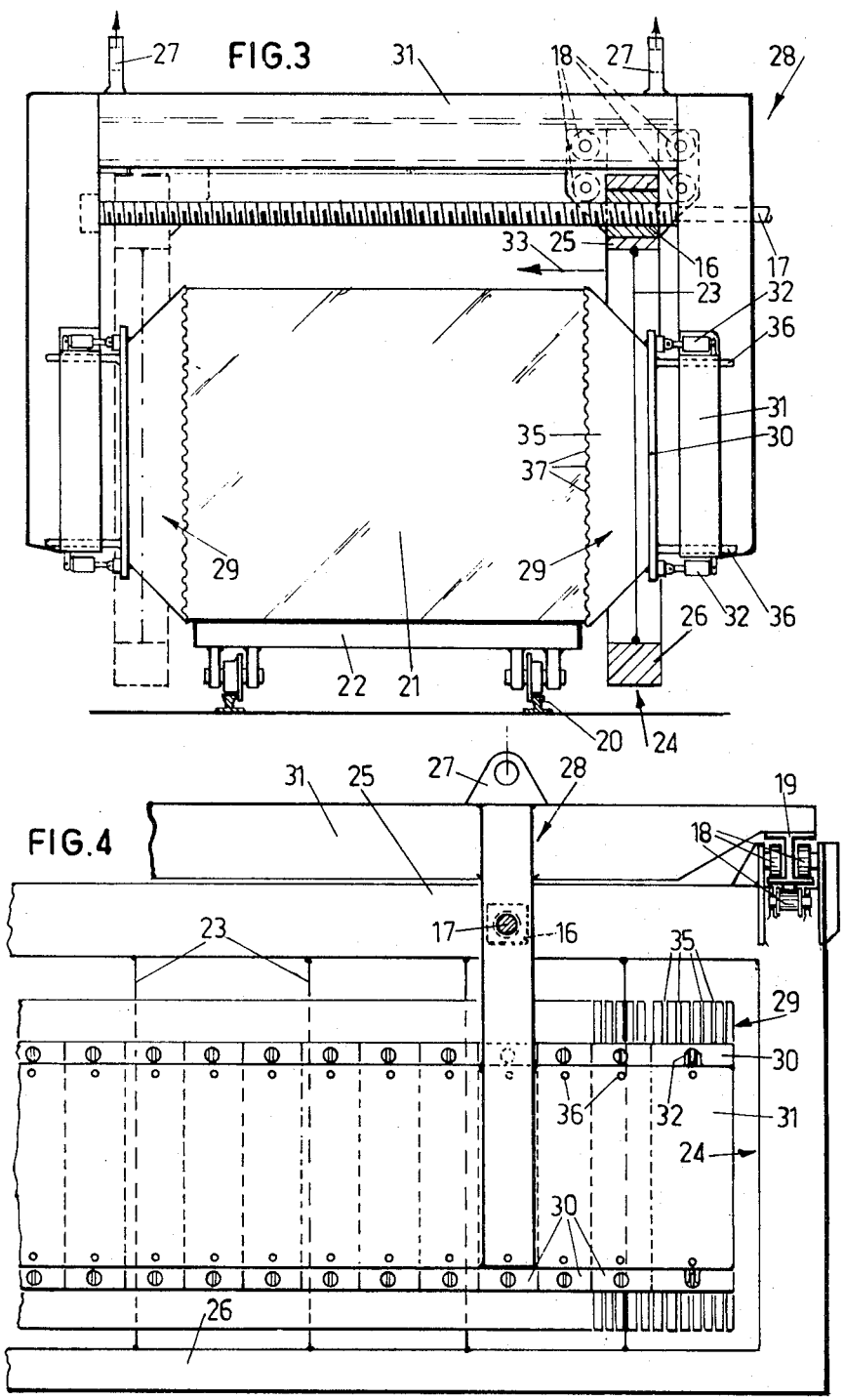

METHOD AND APPARATUS FOR CUTTING PLASTIC MATERIAL

This application is a division of co-pending application Ser. No. 48,267, filed June 22, 1970 now U.S. Pat. No. 3,734,991.

The invention relates to an apparatus for cutting a block of material in a plastic state, more particularly, lightweight concrete, the block being cut by a number of cutting wires each tensioned between a clamping member retained above the block and a clamping member retained therebelow.

In a known method of the kind specified, during cutting, the block stands on a cutting table so shaped that, during cutting, the clamping member retained below the block can more in relation to the cutting table.

The block can be cut only along the planes determined by the construction of the cutting table.

This known method also requires conveying means which can place the block on the cutting table and remove the cut block therefrom.

Another method is known, in which the block can be cut along any selected cutting planes, by the block being conveyed from a first cutting table having conveying means through a frame of cutting wires onto a second cutting table also having conveying means.

The two cutting tables require conveying means which can not only displace the block from the first to the second cutting table, but which are also adapted to take the block from a feed member, for instance, the bottom of a casting mould, and place the block on the first cutting table and to remove the cut block from the second cutting table and place it on a removal member.

The invention provides an apparatus in which the block can be cut along any selected planes parallel with a cutting direction, and in which the required conveying means can be very simple.

To this end, in one embodiment of the apparatus, according to the invention, the block is cut while being carried by carrying means engaging opposite sides of the block.

The apparatus comprises carrying means engaging opposite sides of the block, and a number of cutting wires to cut the block in at least one cutting direction, and is characterized by a relative movement, guided in parallel with the cutting direction, between the block-carrying means and the cutting wires.

These and other features of the invention will be gathered from the following description of a number of embodiments thereof.

In the accompanying drawings, which show variants of the embodiments according to the invention:

FIGS. 1 and 2 are a cross-section and a longitudinal section, respectively, through an apparatus according to the invention;

FIGS. 3 and 4 are a cross-section and a partial side elevation, respectively, of a variant apparatus according to the invention, and FIGS. 5 and 6 are a cross-section and a plan view, respectively, of a second variant of the apparatus according to the invention.

Figure 2:
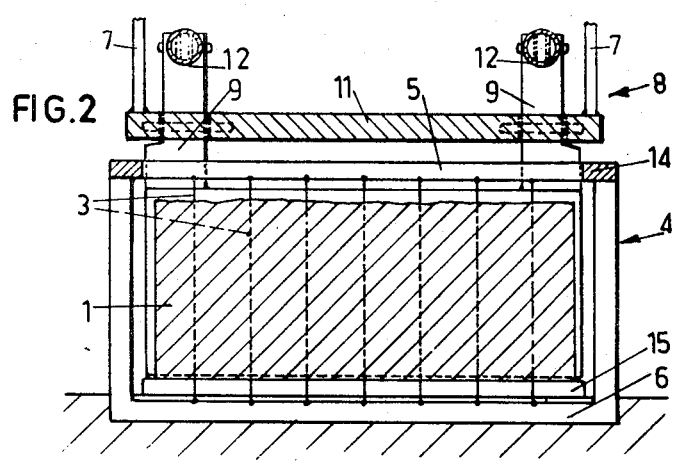

In the method illustrated in FIGS. 1 and 2, a block 1 of lightweight concrete in a plastic state is pushed against cutting wires 3 on the bottom 2 of a casting mould whose walls (not shown) are removed. A top beam 5 and a bottom beam 6 of a stationary cutting frame 4 form the tensioning members for the cutting wires 3.

The block 1 is then seized between clamping jaws 9, 10 of a gripper 8 whose frame 11 is suspended from lifting means 7. The clamping jaws 9, 10 are hingeably suspended from the frame 11 and actuated by jacks 12. When the block 1 is seized, the clamping jaw 9 extends around the top beam 5. The gripper 8 with the block 1 is then raised a short distance and moved, as indicated by dotted lines, in the direction indicated by arrow 13 until the clamping jaw 10 abuts the cutting wires 3. During the cutting, the gripper with the block is guided along guide rods 14. After cutting, the block 1 as shown in dotted lines is deposited on a grid 15 and then conveyed from the cutting frame 4 to a hardening or curing vessel (not shown).

In the method illustrated in FIGS. 3 and 4, a block 21 is fed on a carriage-like bottom 22 of a casting mould, whose walls are removed, over rails 20 between clamping jaws 29 of a gripper 28. The clamping jaws 29 consist of a large number of vertical jaw members 30 each of which are guided by means of horizontal pins 36 in a frame 31 of the gripper 28 and are each brought into a clamped condition by means of jacks 32. The clamping surfaces of the jaw members 30 are formed with projections 37 penetrating into the plastic material of the block 21 and with vertical grooves 35 receiving vertical cutting wires 23. The cutting wires 23 are tensioned between a top beam 25 and a bottom beam 26 of a cutting frame which is suspended by means of rollers 18 on rails 19 from the frame 31 and engages via nuts 16 driven screw-threaded spindles 17.

After the block 21 has been tightly clamped between the clamping jaws 29, in the condition of the cutting frame 24 shown in solid lines, the gripper 28 together with the block 21 is raised by raising means 27 engaging the frame 31, so that the cutting frame 24 is disposed completely above the level of the bottom 22. Then, by driving the screw-threaded spindles 17 together, the cutting frame 24 is moved in the cutting direction 33 to the position shown in dotted lines, so that the block 21 is cut. Lastly, the gripper 28 is brought downwards, and the block 21 is placed on the bottom 22 or some other carrier. Each portion of the cut block 21 is reliably carried, since the clamping jaws 29 are subdivided into a number of jaw members 30 which are pressed against the block independently by means of jacks 32.

Figure 6:
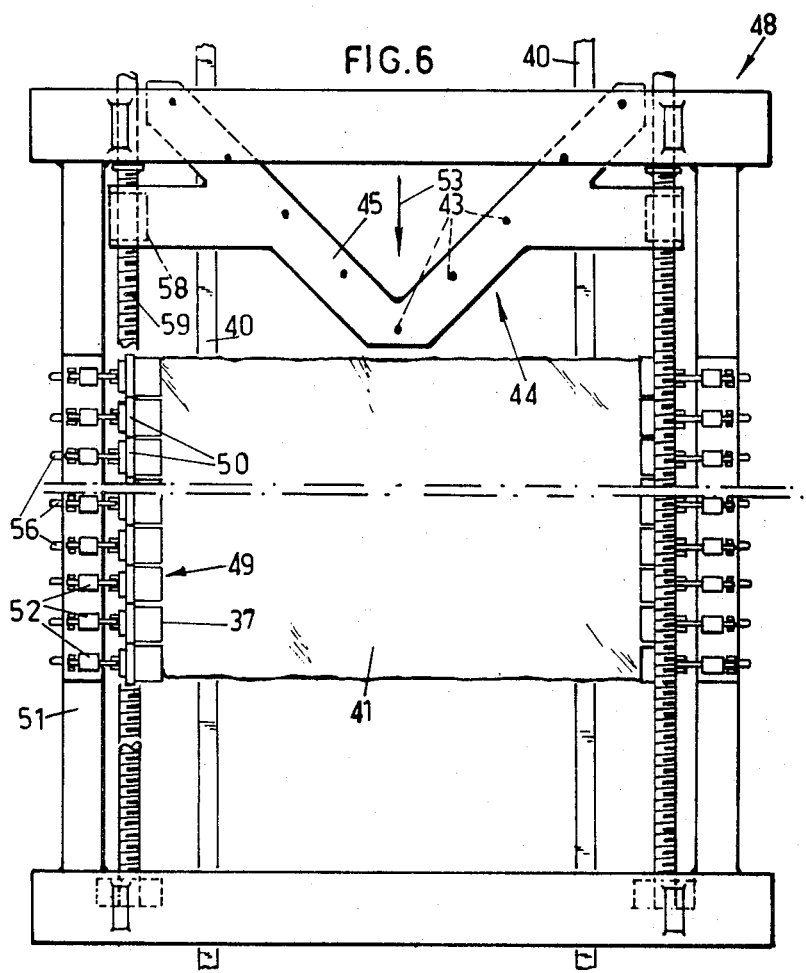

In the method illustrated in FIGS. 5 and 6, a block 41 is fed on a carriage-like bottom 42 of a casting mould over rails 40 between clamping jaws 49 of a gripper 48. The clamping jaws 49 consist of a large number of vertical jaw members which have projections 37, each guided by horizontal pins 56 in a frame 51 of the gripper 48, and each brought into a clamped condition by rams 52.

Cutting wires 43 are tensioned between V-shaped beams 45, 46 of a cutting frame 44. The cutting wires 43 are therefore receded in relation to one another, viewed in the direction indicated by the arrow 53, so that they come into contact with the block 41 successively. The cutting frame 44 is guided by rollers, not shown, parallel with the clamping jaws 49, over rails, not shown of a frame 51 and, when the gripper 48 is raised, the cutting frame 44 can be driven by means of nuts 58 and screw-threaded spindles 59 in cutting direction 53, so that the block 41 is cut. During the cutting of the block 41, behind the cutting wires 43, open grooves are produced which, however, are tightly closed again by the clamping pressure of the clamping jaws 49. The width of the block 41 is reduced by one cutting wire width for each cutting wire.

What is claimed is:

1. An apparatus for cutting a block of material in the plastic state, such as lightweight concrete, which comprises, a cutting frame comprising a plurality of spaced cutting wires disposed substantially vertically under tension between an upper tensioning member and a lower tensioning member, carrying means comprising gripping means for gripping opposite sides of said block so as to provide a free path below the bottom of said block to enable the block to be cut freely along vertical planes running longitudinally of the block, said frame of cutting wires being located between said gripping means, the support of the block being such that the cutting frame is disposed relative to the block so that the upper tensioning member is above the upper surface of said block and the lower tensioning member is below the bottom surface thereof, and means cooperatively associated with said carrying means and said cutting frame for causing said frame and said block-carrying means to move relative to one another parallel to the cutting direction whereby to cause the cutting wires to pass freely through said plastic block supported by said carrying means and effect the cutting thereof.

2. The apparatus of claim 1, wherein the gripping means comprises at least two clamping jaws which move relative to each other in gripping opposite sides of said block.

3. The apparatus of claim 2, wherein at least one of the two clamping jaws is subdivided into a plurality of clamping members which press against the block independent of each other.

4. The apparatus of claim 1, wherein the gripping means is suspended from a frame, wherein said gripping means is comprised of clamping jaws for gripping opposite sides of said block, and wherein said cutting frame is moveably supported between said jaws on guides running parallel to the cutting direction.

5. The apparatus of claim 4, wherein the cutting frame is made of upper and lower V-shaped tensioning members so that the wires tensioned therebetween recede relative to one another.

6. The apparatus of claim 1, wherein the cutting frame is stationary and wherein the gripping means carrying the block is moved relative to said cutting frame.

* * * * *